Figure 1:
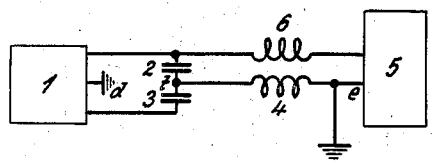

April 9, 1940.　　F. GUTZMANN　　2,196,673
MEANS FOR INTERCONNECTING EARTHED PARTS OF A CIRCUIT ARRANGEMENT Filed Sept. 27, 1937

Inventor:
Fritz Gutzmann
by R. C. Hopgood
Attorney

Patented Apr. 9, 1940

2,196,673

UNITED STATES PATENT OFFICE 2,196,673

MEANS FOR INTERCONNECTING EARTHED PARTS OF A CIRCUIT ARRANGEMENT

Fritz Gutzmann, Fichtenau, Kreis Niederbarnim, Germany, assignor to C. Lorenz Aktiengesellschaft, Berlin-Tempelhof, Germany, a company Application September 27, 1937, Serial No. 165,960
In Germany September 26, 1936

10 Claims. (Cl. 178—44)

(Granted under the provisions of sec. 14, act of March 2, 1927; 357 O. G. 5)

In high frequency transmitters it is often necessary that a push-pull connected stage, arranged symmetrically in relation to its grounding point, be joined to downleads of the antenna which are asymmetrical with respect to earth. Circuit arrangements are known wherein a bridge or a phase-shifting transformer, for instance, serve this purpose. These known arrangements, however, are not easy to survey and above all are difficult to balance. Transition devices thus arranged to connect a symmetrical part of a circuit arrangement to an asymmetrical part thereof require that in the case of no load as well as in the event of a short-circuit on the asymmetric side of the circuit arrangement, the state of symmetry on the symmetric side thereof shall not be affected.

The invention has for its object to fulfil this requirement and to such end consists in certain features of novelty which will appear from the following description and be particularly pointed out in the appended claims, reference being had to the accompanying drawing in which Figs. 1 to 7 are wiring diagrams each showing one embodiment of the invention. Like reference characters indicate like parts in the several views.

I denotes an arrangement which is symmetrical with respect to its grounding point $d$. This arrangement, whose construction is immaterial to the invention, may be the final stage of a valve transmitter or high frequency generator, for instance.

The system shown in Fig. 1 has two condensers 2, 3 connected in series on the output side of the arrangement I. These condensers, which constitute a non-dissipative no-load impedance, have each the impedance $-j.\omega, C_1$, $C_1$ being the capacitance of the condenser. A centre tap $t$ between them is over a coil 4 connected to the earthed point $e$ of the loading resistance 5. Resistance 5, represented in a purely diagrammatic manner, may be supposed to be an antenna supply lead, for example. One of the outer points of the symmetrical side, i. e., the side occupied by arrangement I, is over a coil 6 likewise joined to resistance 5. The coils 4, 6 are in the nature of a non-dissipative impedance each, these impedances being in phase opposition to the capacitive impedances 2, 3. The impedance of the coils 4, 6, which are equivalent to each other, is so calculated that with a short-circuit on the asymmetrical side 5, namely, when resistance 5 is zero, a rejector circuit is formed on the symmetric side I. This circuit exists if the coils 4, 6 each have the impedance $\tfrac{1}{2}j.\omega.C_1$. In order to obtain this impedance, the inductance L of the coils 4 and 6 is so selected that its value is half of the capacitance $C_1$ of the condensers 2 and 3. If a short circuit occurs at point $e$ between the ends of the coils 4 and 6, the circuit elements 2, 4 and 6 will be connected into a resonant circuit. The resonant frequency of this circuit will have the value "$\omega$" so that a rejector circuit is obtained which is tuned to the frequency to be transmitted through the circuit arrangement. In this case the point $e$ is not directly connected with the side of the symmetric part, but only over a tuned circuit, that is, over a resistance which is theoretically infinite, so that symmetry is secured.

Figure 2:
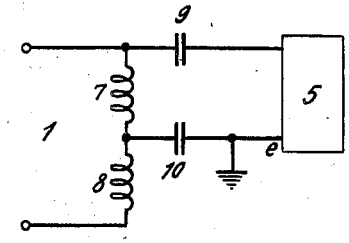

The system shown in Fig. 2 has two coils 7, 8 disposed on the output side of the arrangement I. These coils are each of the same size, being dimensioned in accordance with the rule mentioned in connection with Fig. 1, and are joined to resistance 5 over condensers 9, 10.

Figure 3:
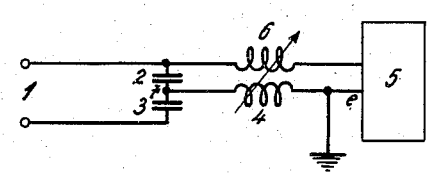

The system represented in Fig. 3 is substantially the same as that illustrated in Fig. 1, except that the coils 4, 6 are coupled to each other, being arranged to form a sort of goniometer, for instance, so that the inductance value $2 \times \tfrac{1}{2}j.\omega$ is obtained by varying the coupling effective between them.

Figure 4:
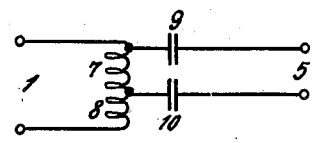

The system illustrated in Fig. 4 resembles that shown in Fig. 2, the difference being that the coils 7, 8, Fig. 2, are comprised in a single coil, which therefore is likewise designated 7, 8.

Figure 5:
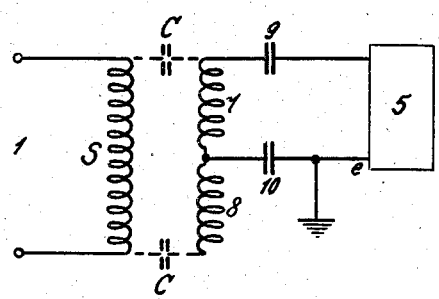

The system represented in Fig. 5 is similar to those illustrated in Figs. 2 and 4, but has a coil S disposed in the output circuit of arrangement I and inductively coupled to the coils 7, 8, which thus are connected with arrangement I in transformer fashion. These coils are connected with resistance 5 by capacitive means, such as condensers 9, 10. The coil capacities C, illustrated in dotted lines, are hereby prevented from causing asymmetry to occur in the system.

Figure 6:
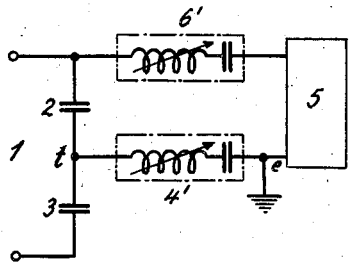

As shown in Fig. 6, series-resonant circuits 4', 6' may be arranged instead of the coils 4, 6, Fig. 1, in order to remove harmonic vibrations.

Figure 7:
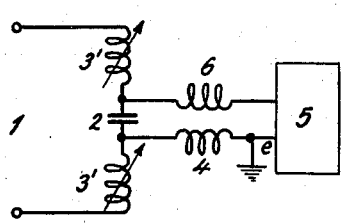

Also, as represented in Fig. 7, condenser 3 in Fig. 1 may be replaced by two coils 3' so calculated that the difference of their impedances $\omega.L_1$ and $\omega.L_2$ is equal to $$\frac{1}{\omega.c}$$

where $c$ is the capacity of condenser 2. This arrangement is of advantage especially if a tuned resonant circuit is employed on the output side, because the resonant value of this circuit can then be adjusted by adjusting the coils 3'. In all the embodiments disclosed, in cases of a short circuit in the unsymmetrical portion between the point of grounding and the extreme point of the symmetric side, a rejector circuit is established over suitable circuit elements for the frequency which is to be transmitted, so that a resistance which is theoretically infinite will exist between the grounding point and the extreme point.

What is claimed is:

1. A circuit arrangement comprising an earthed part symmetrical in relation to its grounding point, an earthed part asymmetric with respect to its grounding point, a non-dissipative no-load impedance connected with two outer points of the symmetrically earthed part and having a centre tap, a non-dissipative intermediate impedance counter-phasal to this no-load impedance and connecting this top to the grounding point of the asymmetrically earthed part, this part having an ungrounded junction point, an intermediate impedance of the same size as the first said intermediate impedance and connecting one of the said outer points of the symmetrically earthed part to said ungrounded point of the asymmetrically earthed part, the two said intermediate impedances being so calculated that on the side occupied by the symmetrically earthed part a rejector circuit is formed whenever a short-circuit occurs on the side occupied by the asymmetrically earthed part.

2. An arrangement according to claim 1, wherein the symmetrically earthed part is a high frequency generator while the asymmetrically earthed part is a loading resistance, and wherein the no-load impedance comprises two serially-connected condensers of the same size while the said intermediate impedances are each a coil whose impedance is half that of each of these condensers.

3. An arrangement according to claim 1, wherein the no-load impedance comprises coils while the said intermediate impedances are constituted by condensers.

4. An arrangement according to claim 1, wherein the no-load impedance comprises coils while the said intermediate impedances are constituted by condensers, these coils being coupled to the symmetrically earthed part in transformer fashion.

5. A circuit arrangement for high frequency alternating currents comprising a grounded part symmetrical with respect to its grounding point, a grounded part asymmetric with respect to its grounding point, and connections between the two parts comprising elements of reactance so proportioned and arranged that a short circuit between the grounding point of the asymmetric part and the extreme point of the asymmetric part will join said elements into a rejector circuit for currents of the frequency transmitted.

6. The circuit arrangement according to claim 5 and in which the reactances comprise condensers and induction coils.

7. The circuit arrangement according to claim 5 and in which the reactances comprise two condensers and two induction coils, and in which the condensers are connected in series to the symmetrical part, one coil is connected between the grounding point of the asymmetric part and the midpoint between the condensers, and the other coil between an outer point of the symmetrical part and the asymmetric part.

8. The circuit arrangement according to claim 5 and in which the reactances comprise two condensers and two induction coils, and in which the condensers are connected in series to the symmetrical part, one coil is connected between the grounding point of the asymmetric part and the midpoint between the condensers, and the other coil between an outer point of the symmetrical part and the asymmetric part, said two condensers constituting a non-dissipative no-load impedance, and said two coils a non-dissipative impedance in phase opposition to said condensers, each condenser having impedance $-j.\omega.C_1$, and the coils have each the impedance $\frac{1}{2}j.\omega.C_1$, $C_1$ being the impedance of a condenser.

9. The circuit arrangement according to claim 5 and in which the reactances comprise two condensers and two induction coils, and in which the induction coils are connected in series to the symmetrical part, one condenser is connected between the grounding point of the asymmetric part and the midpoint between the coils, and the other condenser between an outer point of the symmetrical part and the asymmetric part.

10. The circuit arrangement according to claim 5 and in which the reactances comprise two condensers connected in series to the symmetrical part, and two series resonant circuits, one connected between the grounding point of the asymmetric part and the midpoint between the condensers, and the other between an outer point of the symmetrical part and the asymmetric part.

FRITZ GUTZMANN.